US011946618B2

(12) United States Patent
Liu et al.

(10) Patent No.: US 11,946,618 B2
(45) **Date of Patent: *Apr. 2, 2024**

(54) LIGHTING APPARATUS

(71) Applicant: LEEDARSON LIGHTING CO., LTD, Fujian (CN)

(72) Inventors: Zongyuan Liu, Fujian (CN); Yankun Li, Fujian (CN); Yibin Chen, Fujian (CN); Hemu Ye, Fujian (CN)

(73) Assignee: LEEDARSON LIGHTING CO.,LTD, Fujian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/074,144

(22) Filed: Dec. 2, 2022

(65) Prior Publication Data

US 2023/0098381 A1 Mar. 30, 2023

Related U.S. Application Data

(63) Continuation of application No. 17/557,835, filed on Dec. 21, 2021, now Pat. No. 11,543,094.

(30) Foreign Application Priority Data

Dec. 21, 2020 (CN) .......................... 202023101727.9
Dec. 21, 2020 (CN) .......................... 202023105656.X
Dec. 21, 2020 (CN) .......................... 202023105869.2
Dec. 21, 2020 (CN) .......................... 202023145810.6

(51) Int. Cl.
*F21S 9/03* (2006.01)
*F21V 23/00* (2015.01)
*H05B 45/10* (2020.01)
*H05B 45/30* (2020.01)

(52) U.S. Cl.
CPC .............. *F21S 9/03* (2013.01); *F21V 23/003* (2013.01); *H05B 45/10* (2020.01); *H05B 45/30* (2020.01)

(58) Field of Classification Search
CPC ...... H05B 45/18; H05B 45/325; H05B 45/34; H05B 45/345; H05B 45/37; H05B 47/11; H05B 47/17; H05B 45/10; H05B 45/30; Y02B 20/40
See application file for complete search history.

(56) References Cited

U.S. PATENT DOCUMENTS 9,655,217 B2 * 5/2017 Recker .................. H05B 47/16
10,760,746 B2 * 9/2020 Sreshta .................. F21V 31/00
2011/0060701 A1 * 3/2011 Verfuerth ............... G06Q 99/00
315/129
2022/0196218 A1 * 6/2022 Liu ..................... F21V 21/0824

* cited by examiner

*Primary Examiner* — Monica C King
(74) *Attorney, Agent, or Firm* — Chun-Ming Shih; LANWAY IPR SERVICES

(57) ABSTRACT

A lighting apparatus includes a solar plate, a battery, a driver module, a light source, a lens tube, a main housing and a plugging bar. The solar plate converts a sunlight to an electricity. The battery stores the electricity. The driver module converts the electricity stored in the battery to a driving current. The solar plate is placed on a top side of the driver module and the light source is placed on a bottom side of the driver module. The lens tube has a top opening and a bottom opening. The top opening has a larger size than the bottom opening. The top opening is closer to the light source than the bottom opening. A light of the light source is emitted via a lateral lens surface of the lens tube between the top opening and the bottom opening.

20 Claims, 13 Drawing Sheets

LIGHTING APPARATUS

RELATED APPLICATION

The present application is a continued application of U.S. patent application Ser. No. 17/557,835.

FIELD

The present invention is related to a lighting apparatus, and more particularly related to a lighting apparatus with a plugging bar.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

There are many gardens around the world that need illumination in the night time. It is difficult to provide such illumination in the past because wires need to be allocated for providing power to such light devices.

It is therefore beneficial to develop a light device that can be easily deployed in different types of places while having a compact design and low manufacturing cost.

SUMMARY

In some embodiments, a lighting apparatus includes a solar plate, a battery, a driver module, a light source, a lens tube, a main housing and a plugging bar.

The solar plate converts a sunlight to an electricity.

The battery stores the electricity.

The driver module converts the electricity stored in the battery to a driving current.

The solar plate is placed on a top side of the driver module and the light source is placed on a bottom side of the driver module.

The lens tube has a top opening and a bottom opening.

The top opening has a larger size than the bottom opening.

The top opening is closer to the light source than the bottom opening.

A light of the light source is emitted via a lateral lens surface of the lens tube between the top opening and the bottom opening.

The main housing holds the lens tube and the driver module.

The plugging bar has a top end and a bottom end.

The bottom end is partly inserting into a ground.

The top end is attached to the main housing.

In some embodiments, the a lighting apparatus may also include a lampshade attached to the main housing for enclosing the lens tube.

In some embodiments, the lampshade is partly transparent allowing the light to escape outside the lampshade.

In some embodiments, the lampshade is replaceable to generate a different light pattern.

In some embodiments, the lens tube has multiple bars extended from the top opening to the bottom opening.

In some embodiments, the plugging bar has a first part and a second part.

The top end is at the first part.

The bottom end is at the second part.

There is a plugging structure for attaching the first part to the second part.

In some embodiments, the driver module has a driver box with a top cover and a bottom cover.

The solar plate is attached on the top cover.

The light source is attached on the bottom cover.

In some embodiments, the main housing has a cavity for inserting the driver box.

In some embodiments, the main housing has a waterproof wall surrounding the driver box.

In some embodiments, the driver is connected to a light sensor for detecting an ambient light level.

The driver automatically turns on the light source when the ambient light level is below a threshold.

In some embodiments, the driver is connected to a clock for automatically turns on the light source when a current time of the clock reaches a predetermined time.

In some embodiments, the lens tube is replaceable by removing the driver module temporarily for changing a light output pattern of the light.

In some embodiments, the lens tube is replaceable by removing the driver module temporarily for changing a light output color.

In some embodiments, the driver has a wireless circuit for receiving a turn-on command from a neighbor light device.

The wireless circuit forwards the turn-on command outwardly to turn on other neighbor light devices.

In some embodiments, the driver has a turn-on switch for turning on the light source.

The driver generates the turn-on command to be transmitted by the wireless circuit when the turn-switch is turned on.

In some embodiments, the turn-on command includes a light parameter for the driver to control the light source to render the light with the light parameter.

In some embodiments, the light parameter includes a color temperature.

In some embodiments, the other neighbor light devices outputs a neighbor light with the light parameter.

In some embodiments, the lens tube has a reflective layer for reflecting a part of the light to the top side of the driver module.

In some embodiments, the solar plate has an antenna connected to the driver.

DETAILED DESCRIPTION

Figure 12:
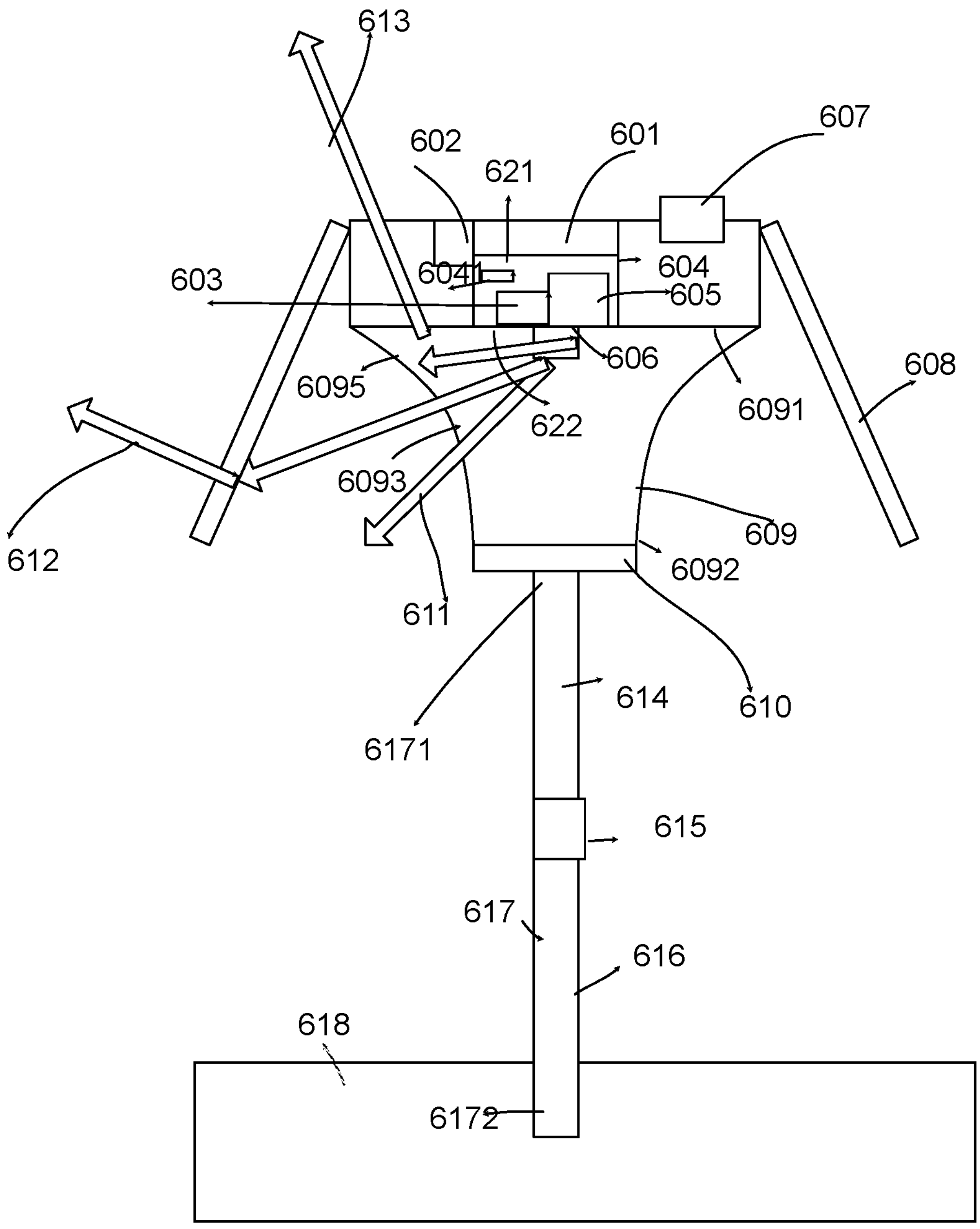
FIG. 12 shows another embodiment.
Figure 13:
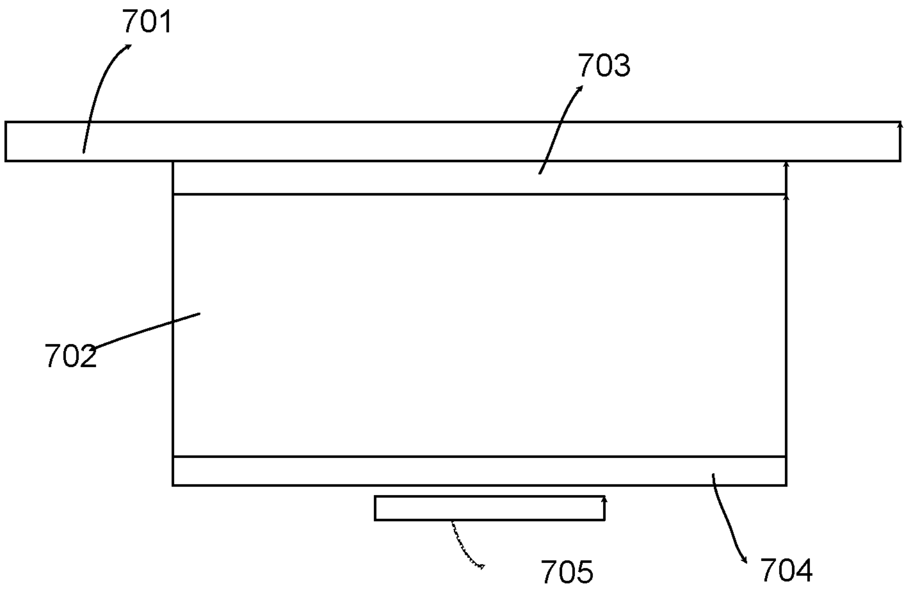
FIG. 13 shows a driver box example.

In FIG. 12, a lighting apparatus includes a solar plate 601, a battery 603, a driver module 604, a light source 606, a lens tube 609, a main housing 610 and a plugging bar 617.

The solar plate 601 converts a sunlight to an electricity. For example, there are multiple solar cells placed on a plate for collecting energy of sunlight and turns the energy to electricity. The electricity is gathered and then stored in the battery 603.

The lighting apparatus may be used when there is no sunlight, e.g. at night.

The driver module 604 converts the electricity stored in the battery 603 to a driving current.

The solar plate 601 is placed on a top side 621 of the driver module 604 and the light source 606 is placed on a bottom side 622 of the driver module 604.

The lens tube 609 has a top opening 6091 and a bottom opening 6092.

The top opening 6091 has a larger size than the bottom opening 6092.

The top opening 6091 is closer to the light source 606 than the bottom opening 6092. For example, the top opening 6091 is at a similar height as the light source 606 in FIG. 12, while the bottom opening 6092 is at a lower height position.

A light 611 of the light source is emitted via a lateral lens surface 6093 of the lens tube 609 between the top opening 6091 and the bottom opening 6092. The profile of the lateral surface 6093 may be a concave curve for reflecting light to a ground 618.

The main housing 610 holds the lens tube 609 and the driver module 605. The lens module 609 may be placed inside the main housing or used as a part for supporting the driver module 604.

The plugging bar 617 has a top end 6171 and a bottom end 6172.

The bottom end 6172 is partly inserting into the ground 6172.

The top end 6171 is attached to the main housing 610.

In some embodiments, the a lighting apparatus may also include a lampshade 608 attached to the main housing 610 for enclosing the lens tube 609.

In some embodiments, the lampshade 609 is partly transparent allowing the light 612 to escape outside the lampshade 608.

In some embodiments, the lampshade is replaceable to generate a different light pattern. For example, a different lampshade 608 may be attached to the main housing 610.

In some embodiments, the lens tube 609 has multiple bars extended from the top opening 6091 to the bottom opening 6092.

Figure 11:
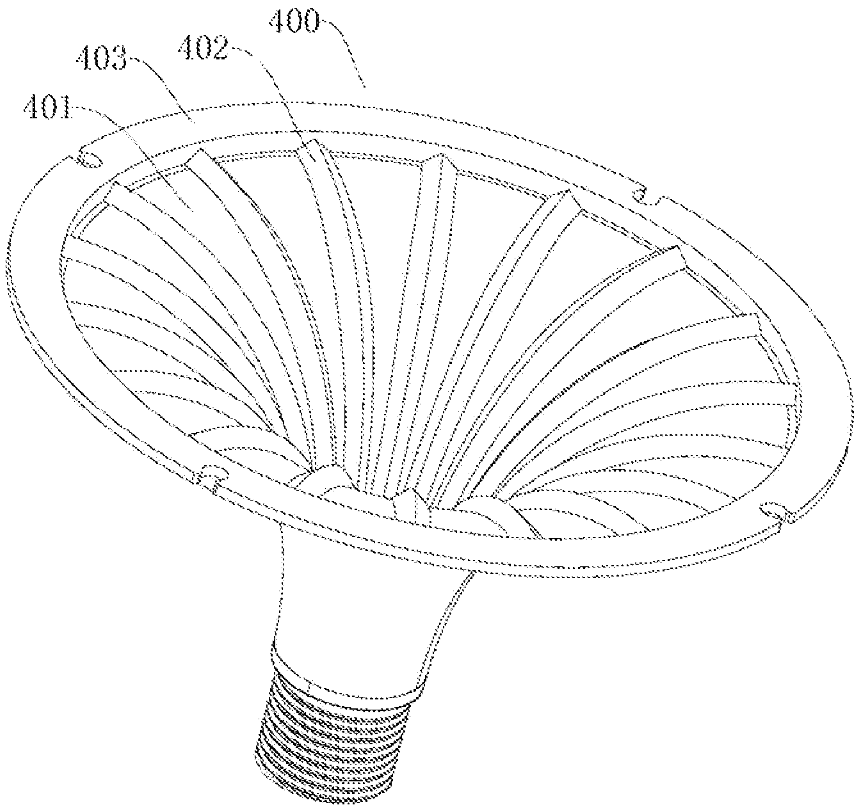
FIG. 11 illustrates a lens tube example.

For example, FIG. 11 shows multiple bars 402 for generating condensed light bar effect.

In FIG. 12, the plugging bar 617 has a first part 614 and a second part 616.

The top end 6171 is at the first part 614.

The bottom end 6172 is at the second part 616.

There is a plugging structure 615 for attaching the first part 614 to the second part 616.

In some embodiments, the driver module 606 has a driver box 702 with a top cover 703 and a bottom cover 704.

The solar plate 701 is attached on the top cover 703.

The light source 705 is attached on the bottom cover 704.

Figure 8:
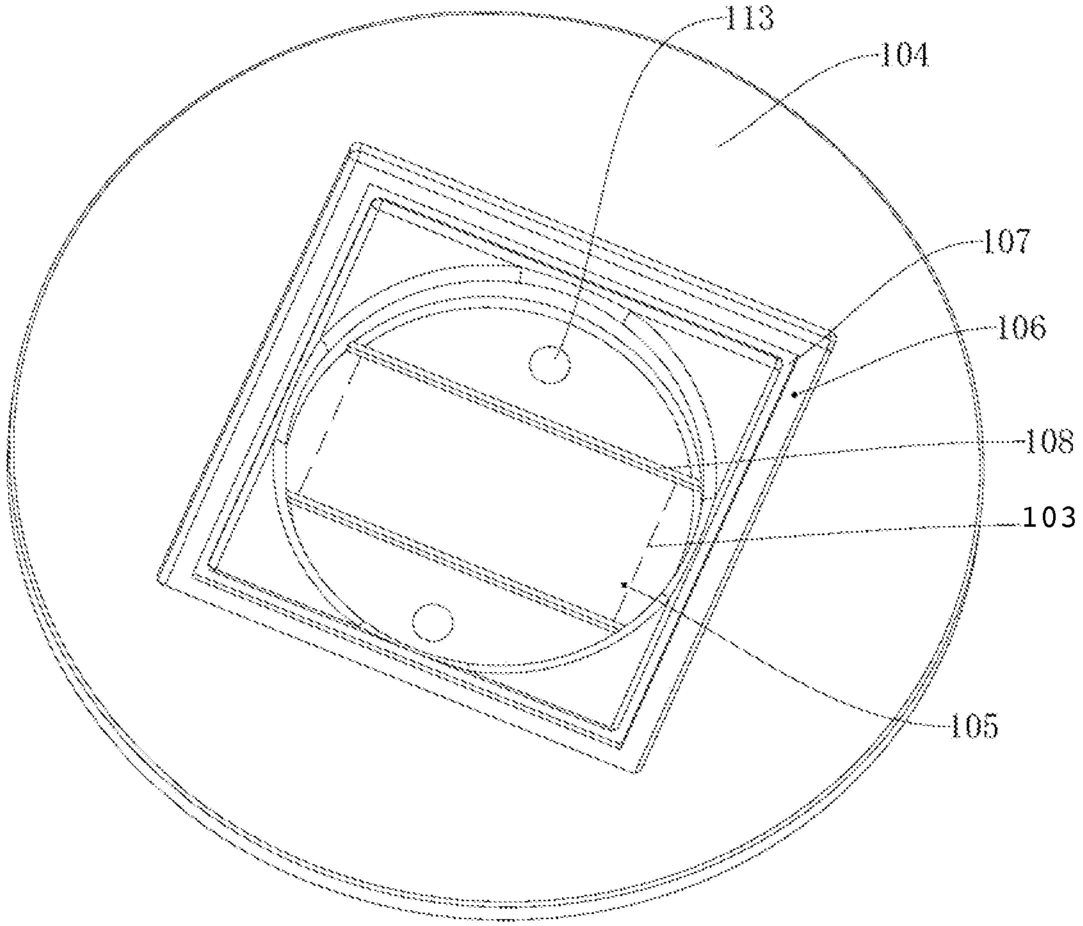
FIG. 8 illustrates a cavity example of the main housing.

In FIG. 8, the main housing has a cavity 105 for inserting the driver box.

In FIG. 8, the main housing has a waterproof wall 107 surrounding the driver box.

In FIG. 12, the driver is connected to a light sensor 602 for detecting an ambient light level.

The driver module 604 automatically turns on the light source 606 when the ambient light level is below a threshold.

In some embodiments, the driver module 604 is connected to a clock 6041 for automatically turns on the light source 606 when a current time of the clock 6041 reaches a predetermined time, e.g. 6 pm each day.

In some embodiments, the lens tube is replaceable by removing the driver module temporarily for changing a light output pattern of the light.

In some embodiments, the lens tube is replaceable by removing the driver module temporarily for changing a light output color.

In some embodiments, the driver has a wireless circuit 605 for receiving a turn-on command from a neighbor light device.

Figure 14:
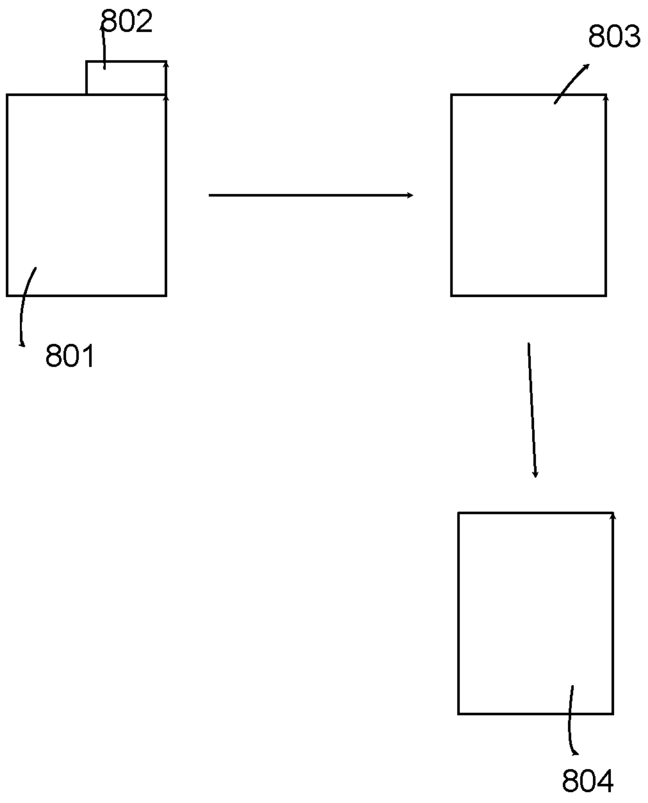
FIG. 14 shows interaction among multiple lighting devices.

FIG. 14 shows three light devices 801, 803, 804 disposed in an area. Each light device has the structure as mentioned above.

The wireless circuit of the light device 801 forwards the turn-on command outwardly to turn on other neighbor light device 803. The light device 803 may further forwards the turn-on command to another light device 804. Therefore, when there are many light devices placed on a wide area of ground, turning on any one of the light devices activates other light devices. This is very convenient to operate the light devices.

In some embodiments, the driver has a turn-on switch 802 for turning on the light source.

The driver generates the turn-on command to be transmitted by the wireless circuit when the turn-switch is turned on.

The turn-on command may be a wireless signal, which is invisible and thus is not particularly illustrated in the drawings but would be known to persons of ordinary skilled in the art.

In some embodiments, the turn-on command includes a light parameter for the driver to control the light source to render the light with the light parameter.

In some embodiments, the light parameter includes a color temperature.

In some embodiments, the other neighbor light devices outputs a neighbor light with the light parameter.

In FIG. 12, the lens tube has a reflective layer 6095 for reflecting a part of the light 613 to the top side of the driver module 604.

In some embodiments, the solar plate has an antenna 607 connected to the driver 604 for transmitting a wireless signal. The solar plate is placed on the top of the light device and thus is a great position for placing the antenna to lower down influence of other components.

Figure 1:
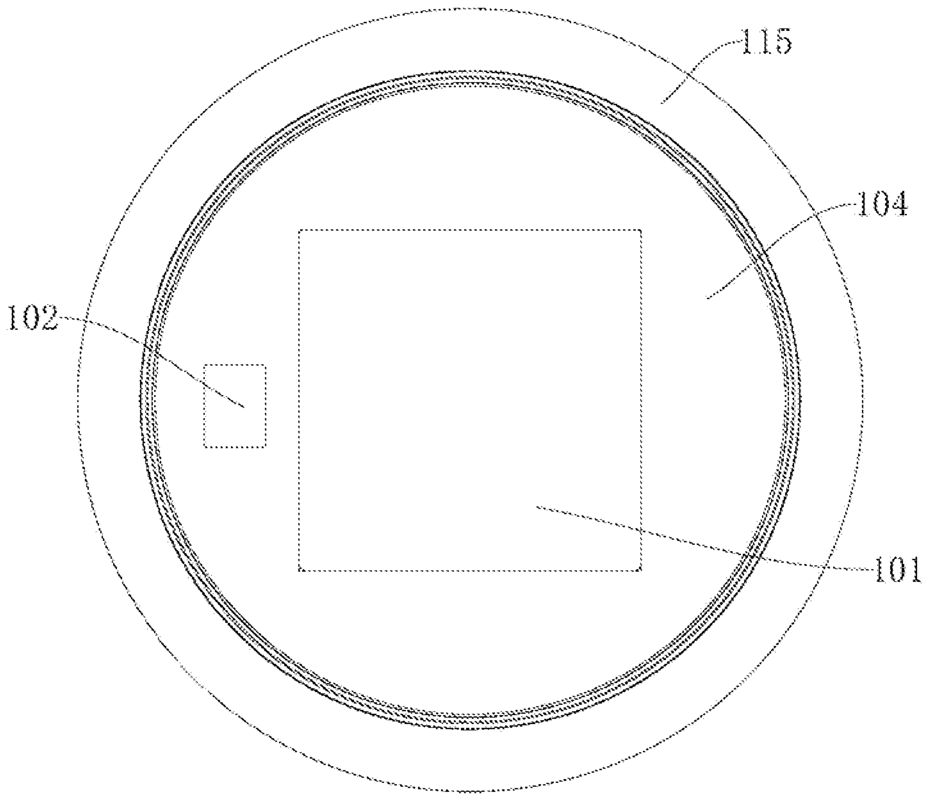
FIG. 1 illustrates a top view of a lighting apparatus.

Please refer to FIG. 1. In FIG. 1, a lighting apparatus has a lampshade 115, a driver box 104, a main housing 101 and a light sensor 102.

Figure 2:
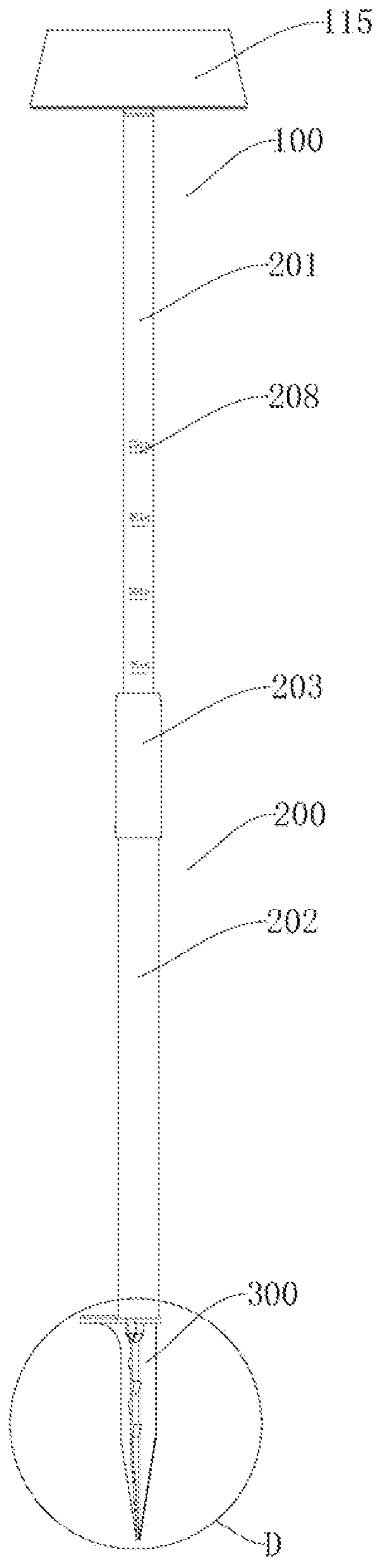
FIG. 2 illustrates a side view of the example in FIG. 1.

Please refer to FIG. 2 of a lighting apparatus 100. In FIG. 2, the lampshade 115 and enclosed components are placed on a plugging bar 200.

The plugging bar 200 has a first part 201 and a second part 202 connected by a plugging structure 203. There are multiple labels 208 shown on the plugging bar 200 so that users may adjust a length of the plugging bar 200. There a bottom end 300 for partly inserting to a ground.

Figure 3:
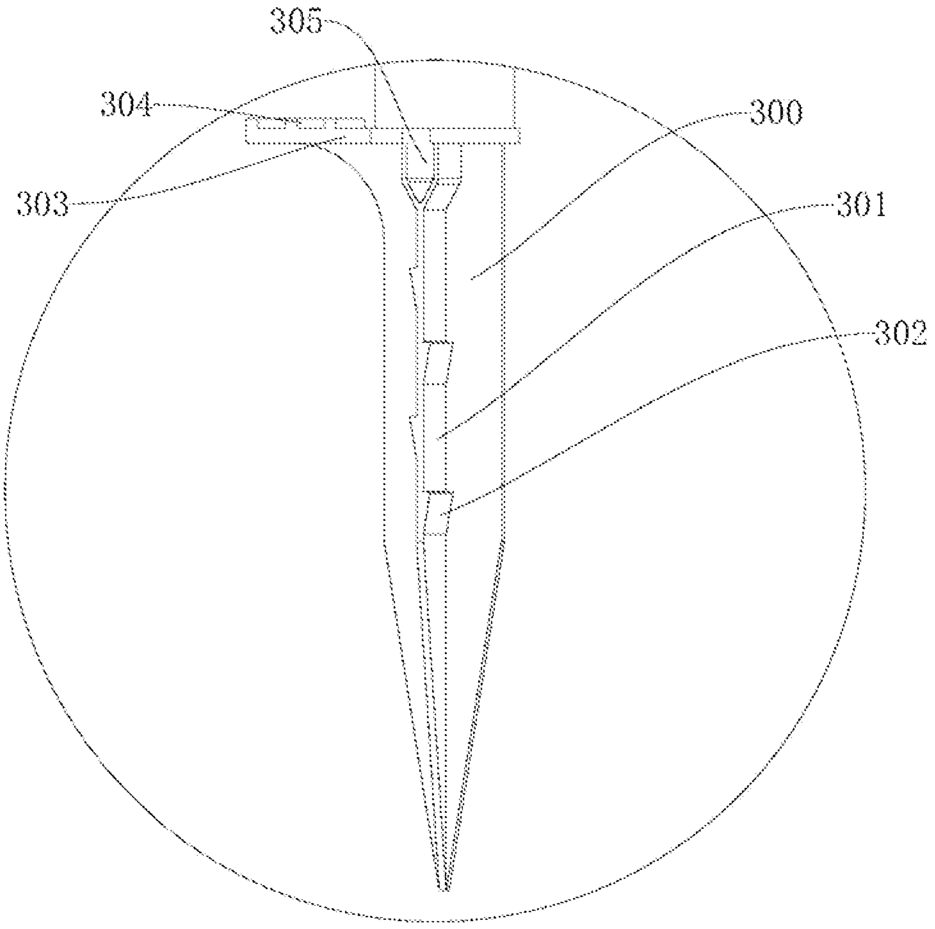
FIG. 3 illustrates a zoom-up view of a bottom end of a plugging bar example.

FIG. 3 shows a zoom-up view of the area D in FIG. 2. The bottom end 300 has a friction plate 301 and protruding parts 302 for fixing to the ground.

There are flexible structures 305 for expanding the bottom end 300 to fix to the ground more reliably. There is a pad 303 with strips 304 for users to use foot to press thereon to insert the bottom end 300 to the ground.

Figure 4:
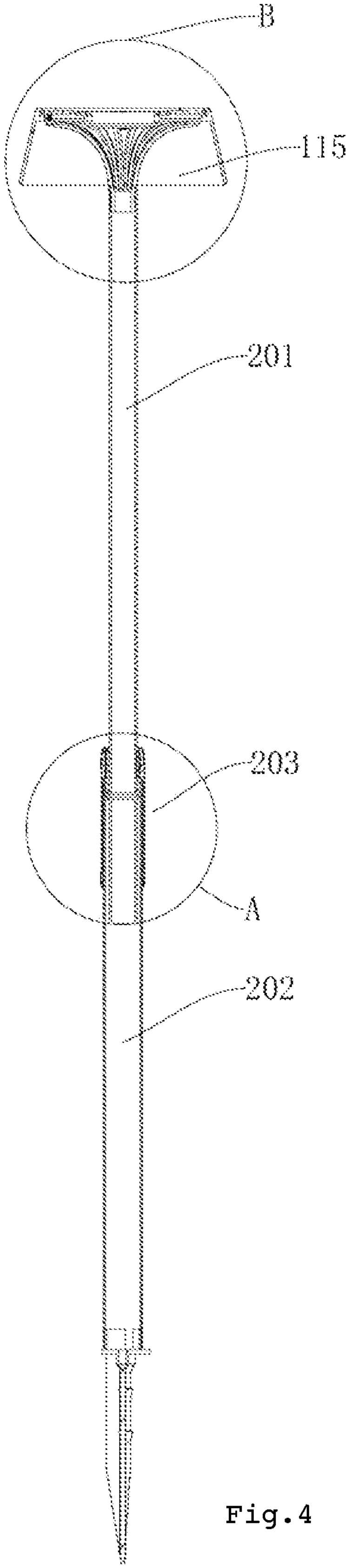
FIG. 4 illustrates a structure example of the example.

FIG. 4 shows a cross-sectional view of several important parts of the lighting apparatus. In FIG. 4, the lampshade 115 is placed on the first part 201 of the plugging bar. There is a second part 202 attached to the first part 201 with the plugging structure 203.

Figure 5:
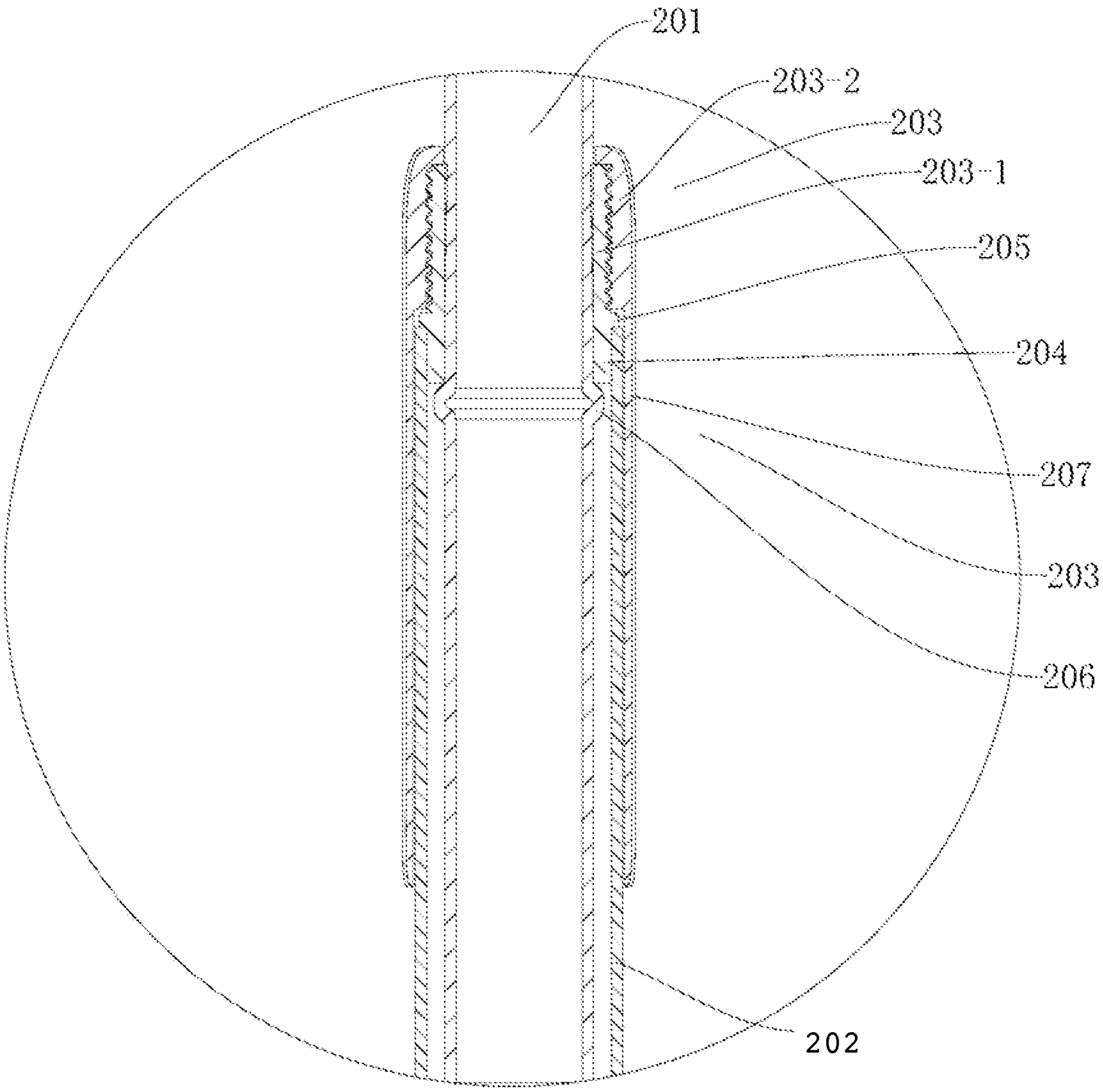
FIG. 5 illustrates a zoom-up view of a portion of the plugging bar.

FIG. 5 shows a zoom-up view of the area A in FIG. 4. In FIG. 5, the first part 201 is inserted into the plugging structure 203 to connect to the second part 202. The plugging structure has a pressing clip 203-1, a fixing sleeve 203-2 forming an adjusting structure for changing the length of the plugging bar.

There is a limiting ladder 205 to work with a limiting stage 204 to limit maximum adjustment of the plugging bar. There is a guiding sleeve 207 and a limiting ring 206 together with other components to form the plugging structure 203.

Figure 6:
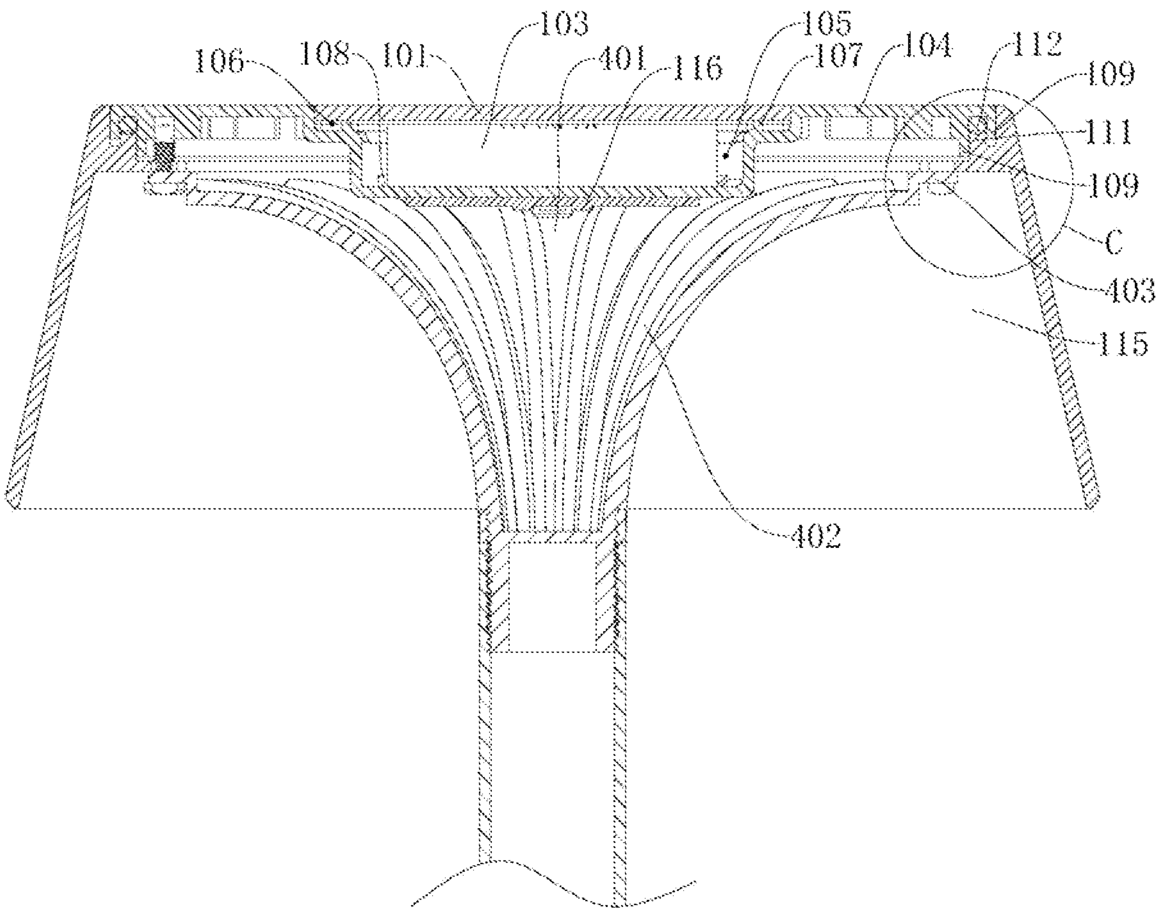
FIG. 6 illustrates a cross-sectional view of a top part of the example in FIG. 1.

FIG. 6 shows a zoom-up view of the area B in FIG. 4. In FIG. 4, the lighting apparatus includes a cavity 105, a protruding strip 107 for preventing water to flow into the battery module 103, a solar plate 101, a limiting plate 108, a support groove 106, a light source 116, a driver box 104, a sealing ring 112, a buckle groove 111, a rib strip 109, a lens tube 400, a first lens part 402, an installation plate 403, a lampshade 115, a first lens part 401, a second lens part 402.

Figure 7:
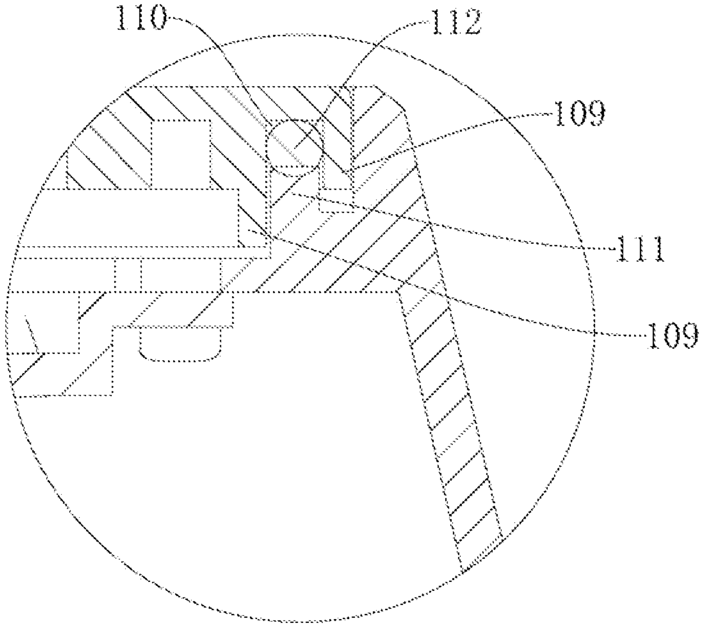
FIG. 7 illustrates a zoom-up view of a connection structure among multiple components.

FIG. 7 shows a zoom-up view of the area C in FIG. 6. In FIG. 7, the sealing ring 112 prevents water to move into the device. The rib strip 109, the buckle groove 110, and the buckle ring 111 form a connecting structure that also provides water-proof function.

In FIG. 8, a top view shows that a driver box 104 is placed with the protruding strip 107 for water-proof. There is a support groove 106, a limiting plate 108, a light sensor 103, a cavity 105, an installation hole 113 on a top surface of the lighting apparatus.

Figure 9:
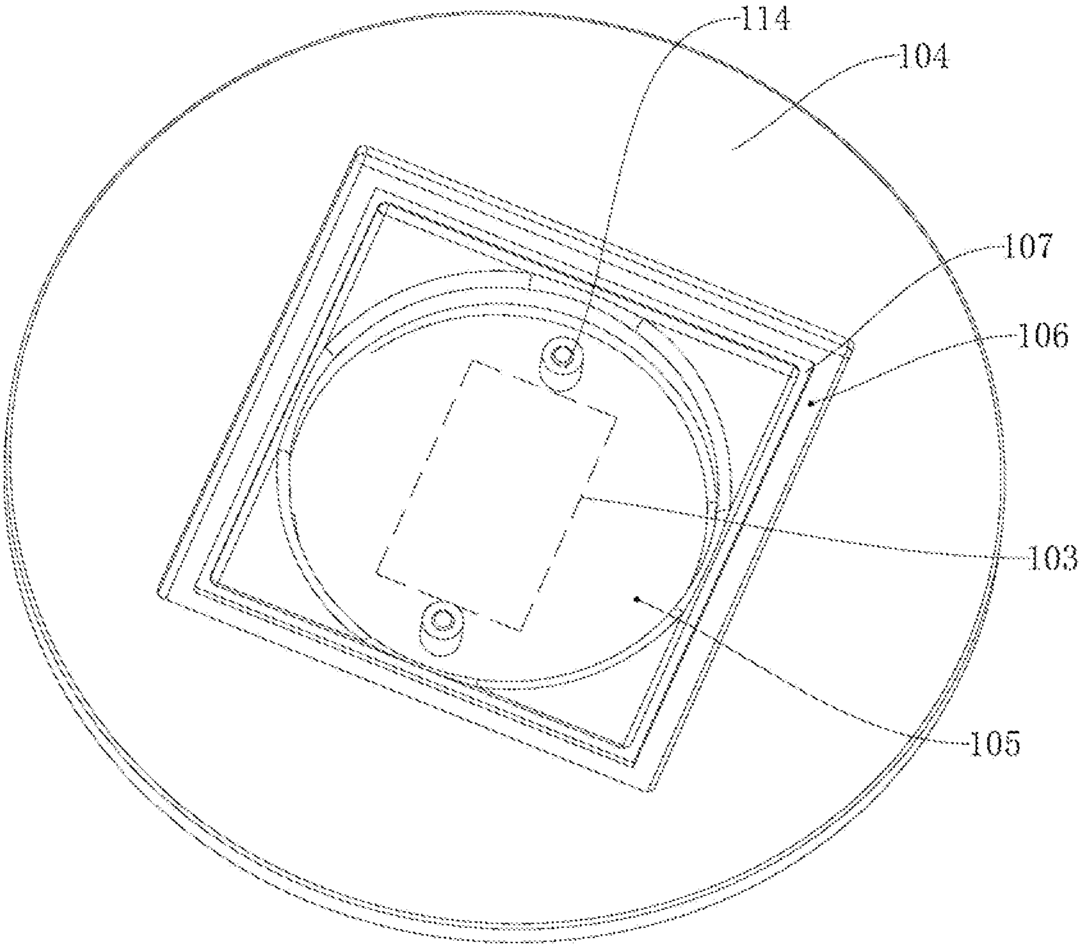
FIG. 9 illustrates an example showing a driver module is placed in the cavity.

FIG. 9 further shows a connector column 114 for connecting components in addition to the components shown in FIG. 8.

Figure 10:
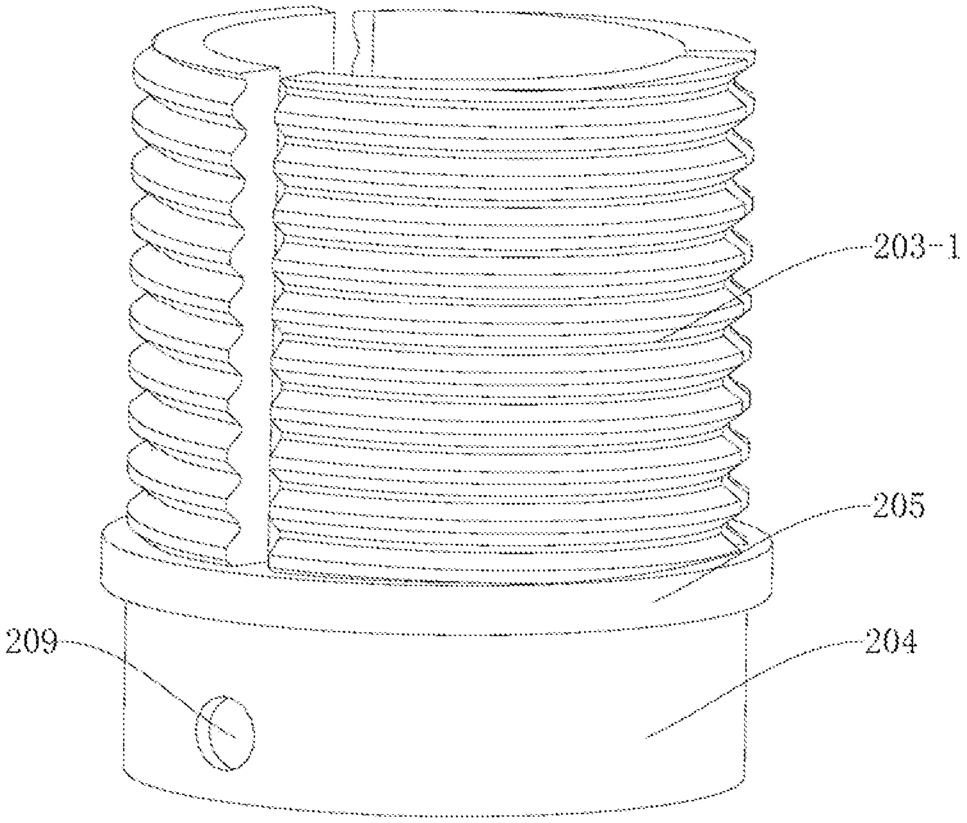
FIG. 10 illustrates a connector component of the plugging structure of the plugging bar.

FIG. 10 shows the plugging structure component. In FIG. 10, there is a pressing clip 203-1 placed on a limiting ladder 205. A fixing stage 204 holds the limiting ladder 205. There is an installation hole 209 placed on the plugging structure.

FIG. 11 shows a lens tube example. In FIG. 11, the lens tube 400 has multiple protruding strips as the second lens part 402 on the first lens part surrounded by an installation peripheral 403.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
- a solar plate for converting a sunlight to an electricity;
- a battery for storing the electricity;
- a driver module for converting the electricity stored in the battery to a driving current;
- a light source;
- a main housing;
- a plugging bar with a top end and a bottom end, wherein the bottom end is partly inserting into a ground, wherein the top end is attached to the main housing; and
- a main housing, wherein the main housing holds the light source, the driver module and the solar plate, wherein the solar plate is disposed for facing upwardly while the light source is disposed downwardly when the plugging bar is inserted partly into a ground downwardly, wherein the main housing has a top part facing upwardly and a bottom part facing downwardly, and wherein the top part of the main housing has a larger size than the bottom part, and wherein the light source emits a light escaping from a lateral side of the main housing.

2. The lighting apparatus of claim 1, wherein the main housing comprises a lens tube, wherein the lens tube has a lateral lens surface, a top opening and a bottom opening, wherein the top opening has a larger size than the bottom opening, wherein the top opening is closer to the light source than the bottom opening, wherein a light of the light source is emitted via the lateral lens surface of the lens tube between the top opening and the bottom opening.

3. The lighting apparatus of claim 2, further comprising a lampshade attached to the main housing for enclosing the lens tube.

4. The lighting apparatus of claim 3, wherein the lampshade is partly transparent allowing the light to escape outside the lampshade.

5. The lighting apparatus of claim 3, wherein the lampshade is replaceable to generate a different light pattern.

6. The lighting apparatus of claim 2, wherein the lens tube has multiple bars extended from the top opening to the bottom opening.

7. The lighting apparatus of claim 2, wherein the plugging bar has a first part and a second part, wherein the top end is at the first part, wherein the bottom end is at the second part, wherein there is a plugging structure for attaching the first part to the second part.

8. The lighting apparatus of claim 2, wherein the driver module has a driver box with a top cover and a bottom cover, wherein the solar plate is attached on the top cover, wherein the light source is attached on the bottom cover.

9. The lighting apparatus of claim 8, wherein the main housing has a cavity for inserting the driver box.

10. The lighting apparatus of claim 8, wherein the main housing has a waterproof wall surrounding the driver box.

11. The lighting apparatus of claim 2, wherein the driver is connected to a light sensor for detecting an ambient light level, wherein the driver automatically turns on the light source when the ambient light level is below a threshold.

12. The lighting apparatus of claim 2, wherein the driver is connected to a clock for automatically turns on the light source when a current time of the clock reaches a predetermined time.

13. The lighting apparatus of claim 2, wherein the lens tube is replaceable by removing the driver module temporarily for changing a light output pattern of the light.

14. The lighting apparatus of claim 2, wherein the lens tube is replaceable by removing the driver module temporarily for changing a light output color.

15. The lighting apparatus of claim 2, wherein the driver has a wireless circuit for receiving a turn-on command from a neighbor light device, wherein the wireless circuit forwards the turn-on command outwardly to turn on other neighbor light devices.

16. The lighting apparatus of claim 15, wherein the driver has a turn-on switch for turning on the light source, wherein the driver generates the turn-on command to be transmitted by the wireless circuit when the turn-switch is turned on.

17. The lighting apparatus of claim 16, wherein the turn-on command comprises a light parameter for the driver to control the light source to render the light with the light parameter.

18. The lighting apparatus of claim 17, wherein the light parameter comprises a color temperature.

19. The lighting apparatus of claim 18, wherein the other neighbor light devices outputs a neighbor light with the light parameter.

20. The lighting apparatus of claim 2, wherein the lens tube has a reflective layer for reflecting a part of the light to the top side of the driver module.

* * * * *